No. 754,767. Patented March 15, 1904.

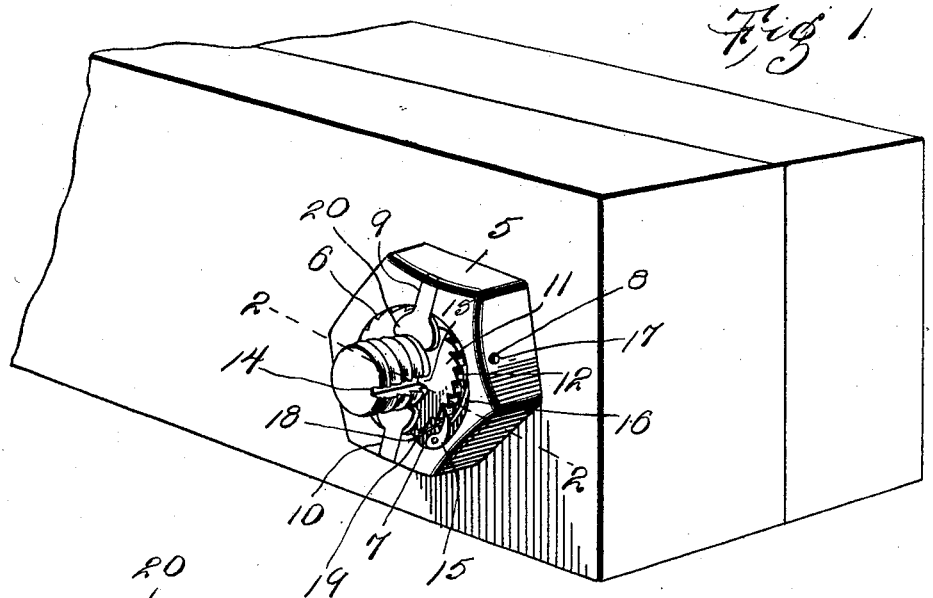
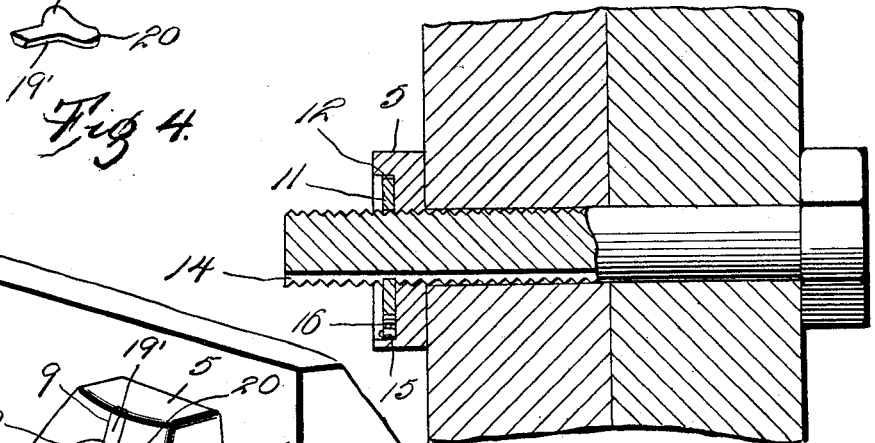
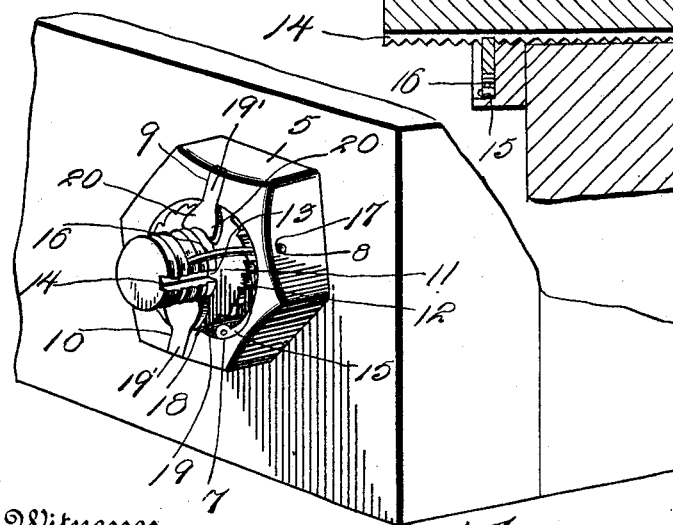

UNITED STATES PATENT OFFICE.

JESSE ELMER HEDRICK, OF LANHAM, WEST VIRGINIA.

NUT-LOCK.

SPECIFICATION forming part of Letters Patent No. 754,767, dated March 15, 1904.

Application filed September 26, 1903. Serial No. 174,797. (No model.)

*To all whom it may concern:*

Be it known that I, JESSE ELMER HEDRICK, a citizen of the United States, residing at Lanham, in the county of Putnam, State of West Virginia, have invented certain new and useful Improvements in Nut-Locks; and I do hereby declare the following to be a full, clear, and exact description of the invention, such as will enable others skilled in the art to which it appertains to make and use the same.

This invention relates to nut-locks, and more particularly to that class known as "ratchet-locks," and has for its object to provide a device of this nature which will be cheap of manufacture and simple of construction, the working parts of which will be entirely within the nut and will lie flush with the upper face thereof to occupy a minimum amount of space.

In the drawings forming a portion of this specification, and in which like numerals of reference indicate similar parts in the several views, Figure 1 is a perspective view of the complete device as applied to a bolt. Fig. 2 is a section on line 2 2 of Fig. 1. Fig. 3 is a view similar view to Fig. 1, showing the retaining-spring raised. Fig. 4 is a detail of one of the ratchet-holding parts.

Referring now to the drawings, there is shown a nut 5, having an annular recess 6 in its upper face and concentric with the perforation of the nut, and a supplemental recess 7, connecting at one of its sides to the recess 6. The nut also has a perforation 8, which extends from one of its faces to an end of the recess 7. At diametrically opposite points upon the face of the nut are a pair of dovetailed grooves 9 and 10, which are considerably less in depth than the recesses 6 and 7.

An annular washer 11, having ratchet-teeth 12 upon its outer periphery, is disposed within the recess 6 and lies with its upper face flush with the lower edge of the dovetailed grooves 9 and 10, this washer being of such a size that it will turn freely within the recess. The washer is also provided with a lug 13, projecting from its inner periphery, which is adapted for engagement with the slot 14 of the bolt, as shown, to prevent rotation of the washer.

Mounted within the recess 7, at one end thereof, is a dog 15, the end of which is held in engagement with the teeth 12 by a spring-plate 16, lying within the recess 7, which bears against the outer face of the dog at one of its ends and which has its other end bent at an angle to itself and disposed within the periphery 8, thus forming a pivot 17 upon which the spring may be turned to disengage its free end from the dog 15.

In a slot 18 in the upper face of the nut there is disposed the end of a second spring 19, which is weaker than the spring 16 and which bears with its free end against the inner face of the ratchet 15. It will thus be seen that when the spring 16 is moved upon its pivot to disengage its free end from the dog 15 the spring 19 just mentioned will hold the dog out of engagement with the teeth 12, and the nut may then be rotated in either direction independently of the washer 11.

To prevent accidental disengagement of the washer from the recess 6, a pair of dovetailed plates 19 are disposed in the grooves 9 and 10 and have laterally-projecting ears 20, which lie within the recess 6 and upon the upper face of the washer 11.

In operation a nut is engaged with a bolt and screwed down until the lug 13 bears against the end of the bolt, when the washer 11 is turned until the lug 13 engages the slot 14, which will hold the washer stationary, though the nut may be rotated in one direction by reason of the dog 15 until its limit of motion is reached. When it is desired to remove a nut, the spring 16 is moved out of engagement with the dog, and the spring 18 will hold the dog away from the teeth 12 and permit the nut to be unscrewed, as described above.

In practice modifications of the specific construction shown may be made, and any suitable material and proportions may be used for the various parts without departing from the spirit of the invention.

What is claimed is—

1. A nut-lock comprising a bolt, a nut disposed upon the bolt, said nut having a recess in its upper face and dovetail slots connecting with the recess, an annular washer disposed within the recess and upon the bolt, means for preventing rotation of the washer, said washer having ratchet-teeth upon its outer periphery, a dog pivoted within the recess, means for holding the dog at times in engagement with the ratchet-teeth, and at times out of engagement with said teeth and keys removably engaged with the slots and projecting over the washer to hold the latter within the recess.

2. A nut-lock comprising a bolt, a nut disposed upon the bolt and having a recess in its upper face, an annular washer having ratchet-teeth upon its outer periphery disposed within the recess and upon the bolt, means for preventing rotation of the washer, a dog pivoted within the recess, a spring-plate pivoted to the inner face of the recess and adapted to be turned into and out of engagement with the dog to hold the latter at times in engagement with the ratchet-teeth, a second spring of lesser strength than the first spring disposed within the recess and bearing against the dog and holding the latter out of engagement with the teeth of the washer when the first-named spring is disengaged from the dog and means for preventing the accidental disengagement of the washer from the recess.

In testimony whereof I affix my signature in presence of two witnesses.

JESSE ELMER HEDRICK.

Witnesses:
O. B. HEDRICK,
W. H. HEDRICK.